US012746739B2

(12) United States Patent
Moore et al.

(10) Patent No.: US 12,746,739 B2

(45) Date of Patent: Sep. 29, 2026

(54) SMOOTH SURFACE HYBRID COMPOSITES

(71) Applicant: The Boeing Company, Chicago, IL (US)

(72) Inventors: Stephen Moore, Renton, WA (US); Timothy L. Williams, Burien, WA (US)

(73) Assignee: The Boeing Company, Arlington, VA (US)

(*) Notice: Subject to any disclaimer, the term of this patent is extended or adjusted under 35 U.S.C. 154(b) by 47 days.

(21) Appl. No.: 17/524,358

(22) Filed: Nov. 11, 2021

(65) Prior Publication Data

US 2022/0152984 A1 May 19, 2022

Related U.S. Application Data

(60) Provisional application No. 63/113,475, filed on Nov. 13, 2020.

(51) Int. Cl.

*B32B 17/06* (2006.01)
*B29C 70/08* (2006.01)

(Continued)

(52) U.S. Cl.

CPC .............. *B32B 17/067* (2013.01); *B32B 3/08* (2013.01); *B32B 5/02* (2013.01); *B32B 5/024* (2013.01); *B32B 5/26* (2013.01); *B32B 37/18* (2013.01); *B64C 1/00* (2013.01); *B64G 1/50* (2013.01); *F28F 21/006* (2013.01); *B32B 2255/00* (2013.01); *B32B 2260/023* (2013.01); *B32B 2260/046* (2013.01); *B32B 2262/101* (2013.01);

(Continued)

(58) Field of Classification Search

CPC .................................................... B32B 17/067

See application file for complete search history.

(56) References Cited

U.S. PATENT DOCUMENTS 4,238,265 A * 12/1980 Deminet .................. G02B 5/10 428/116
4,323,623 A * 4/1982 Ahrens ................. B29C 70/504 156/244.11

(Continued)

FOREIGN PATENT DOCUMENTS

CN 1839024 A * 9/2006 .......... B01J 13/0091
DE 202018104840 U1 * 11/2018 ........... B32B 17/067
JP 2002-120310 A * 4/2002 ......... F28D 14/0233

OTHER PUBLICATIONS

JP 2002-120310 A, Masakazu et al., English Translation (Year: 2002).*

(Continued)

*Primary Examiner* — Frank J Vineis

*Assistant Examiner* — Nicole T Gugliotta

(74) *Attorney, Agent, or Firm* — Walters & Wasylyna LLC

(57) ABSTRACT

Disclosed herein are articles comprising: (a) a glass micro sheet having top and bottom surfaces and a thickness of about 0.001 to about 0.040 inches; and (b) a layer comprising a plurality of composite layers, the layer having top and bottom surfaces, wherein the bottom layer of the glass micro sheet is bonded to the top surface of the layer comprising a (Continued)

plurality of composite layers; and wherein the (Ra) of the top surface of the glass micro sheet is 1 nm<Ra<1 μm, and methods of making same.

20 Claims, 3 Drawing Sheets

(51) Int. Cl.

| | |
|---|---|
| ***B29C 70/24*** | (2006.01) |
| ***B29C 70/88*** | (2006.01) |
| ***B32B 3/08*** | (2006.01) |
| ***B32B 5/02*** | (2006.01) |
| ***B32B 5/26*** | (2006.01) |
| ***B32B 37/18*** | (2006.01) |
| ***B64C 1/00*** | (2006.01) |
| ***B64G 1/50*** | (2006.01) |
| ***F28D 1/02*** | (2006.01) |
| ***F28D 1/03*** | (2006.01) |
| ***F28F 21/00*** | (2006.01) |

(52) U.S. Cl.

CPC ... *B32B 2262/106* (2013.01); *B32B 2305/076* (2013.01); *B32B 2305/10* (2013.01); *B32B 2305/34* (2013.01); *B32B 2305/72* (2013.01); *B32B 2307/302* (2013.01); *B32B 2307/516* (2013.01); *B32B 2307/732* (2013.01); *B32B 2311/24* (2013.01); *B32B 2313/04* (2013.01); *B32B 2315/08* (2013.01); *F28F 2255/06* (2013.01)

(56) References Cited

U.S. PATENT DOCUMENTS

| | | | | | |
|---|---|---|---|---|---|
| 5,441,682 | A * | 8/1995 | Baker | C04B 30/02 264/82 | |
| 2014/0076525 | A1 * | 3/2014 | Mantey | B21D 53/02 165/185 | |
| 2016/0243795 | A1 * | 8/2016 | Gläsner | B32B 37/12 | |

OTHER PUBLICATIONS

Cedillo-Gonzalez et al., "Improvement of the adhesion between TiO2 nanofilm and glass substrate by roughness modifications," Physics Procedia 40 (2013), pp. 19-29 (Year: 2013).*

Gould et al., CN-1839024-A translation (Year: 2006).*

Mitsubishi—Carbon Reinforced Plastics (Year: 2026).*

Paran Advanced Composites, "How Does a Composite Autoclave Work" (Year: 2026).*

* cited by examiner

SMOOTH SURFACE HYBRID COMPOSITES

CROSS REFERENCE TO RELATED APPLICATIONS

This U.S. Non-provisional patent application claims the benefit of priority to U.S. Provisional Patent Application No. 63/113,475 filed Nov. 13, 2020.

FIELD

The disclosure relates to hybrid composite structures with a smooth surface and improved heat transfer out of the structures.

BACKGROUND

Current processes for forming smooth surfaces on composites involves abrasive polishing of the composite surface. These processes can damage the composite by eroding resin and can expose composite fibers.

In addition, heat transfer out of plane of composite aircraft structures is an issue that has previously been addressed by using structures having braided aluminum fiber and diamond powder filled resins. These structures, however, have significant weight and performance issues. It would be desirable to have an alternate solution that has lower weight and/or provides better heat transfer.

SUMMARY

In accordance with one or more embodiments, provided are processes for forming ultra-smooth surfaces on composites that avoid abrasive damage to the composite that can result from polishing the surface to achieve the desired smoothness. Also, in accordance with one or more embodiments, provided are composite structures that result in in improved heat transfer out of the plane of composite structures such as those used in the manufacture of aircraft. In addition, the composite structures provide a lower weight advantage to structures using braided aluminum fiber and diamond powder-filled-resin.

Disclosed herein are articles comprising (a) a glass micro sheet having top and bottom surfaces and a thickness of about 0.001 to about 0.040 inches; and (b) a multi-layered composite film comprising a plurality of composite layers, the multi-layered composite film having top and bottom surfaces. The bottom layer of the glass micro sheet is bonded to the top surface of the multi-layered composite film comprising a plurality of composite layers. The surface roughness of the top surface of the glass micro sheet is $1\ nm<Ra<1\ \mu m$.

Also disclosed are methods method of making a composite article. The methods comprise forming an assembly by (a) placing a glass micro sheet having top and bottom surfaces and a thickness of about 0.001 to about 0.040 inches on a tool surface such that the top surface of the glass micro sheet contacts the tool surface; (b) placing a structure comprising a plurality of composite layers on the glass micro sheet, the structure having top and bottom surfaces such that the top surface of the structure contacts the bottom surface of the glass micro sheet; (c) placing a backing material on the structure, the backing material having top and bottom surfaces, such that the top surface of the backing material contacts the bottom surface of the structure; and (d) curing the assembly to obtain the composite article. The surface roughness of the top surface of the glass micro sheet is $1\ nm<Ra<1\ \mu m$.

The features, functions, and advantages that have been discussed can be achieved independently in various embodiments or can be combined in yet other embodiments further details of which can be seen with reference to the following description and drawings.

DRAWINGS

The various advantages of the embodiments of the present disclosure will become apparent to on skilled in the art by reading the following specification and appended claims, and by referencing the following drawings in which:

Figure 3:
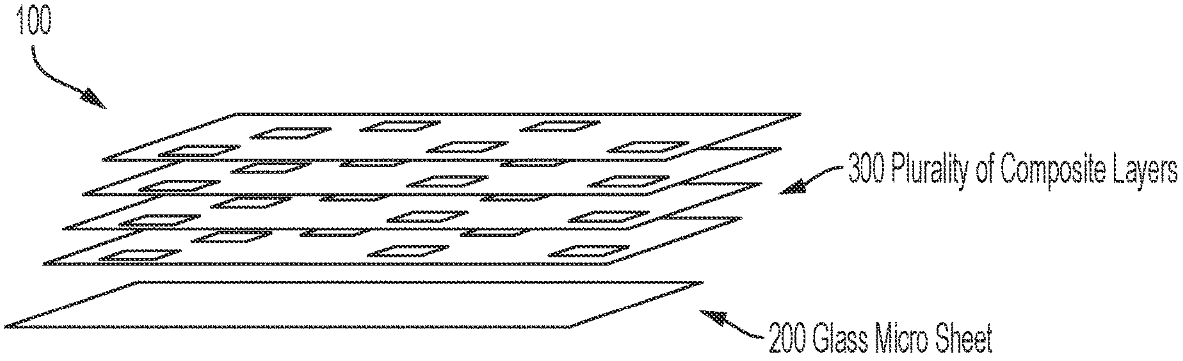

FIG. 3 provides an illustration of a composite structure having thermally conductive strips embedded at predetermined positions in each composite layer to conduct heat through the thickness of the plurality of composite layers in the z direction.

Figure 4:
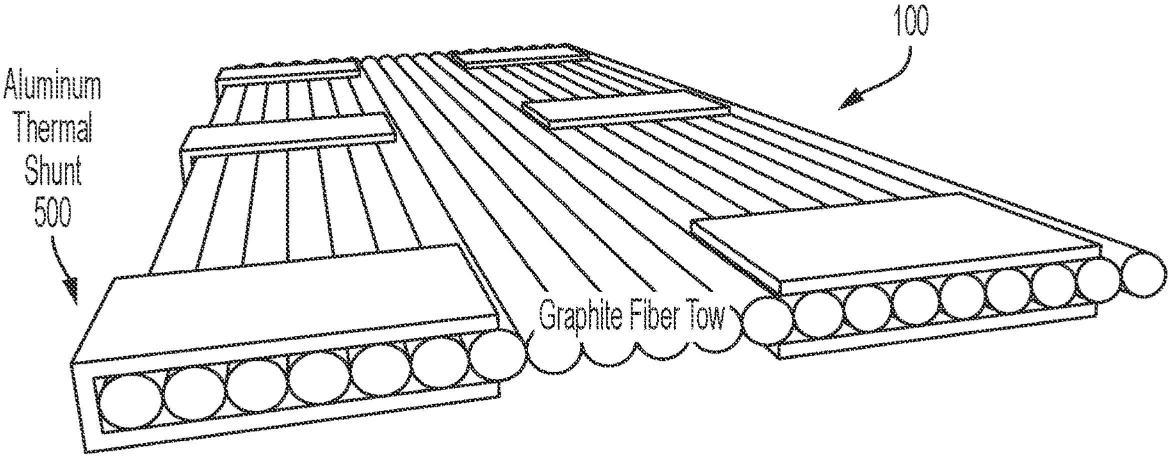

FIG. 4 is an illustration of a graphite fiber tow composite layer having a plurality of thermally conductive strips.

Figure 5:
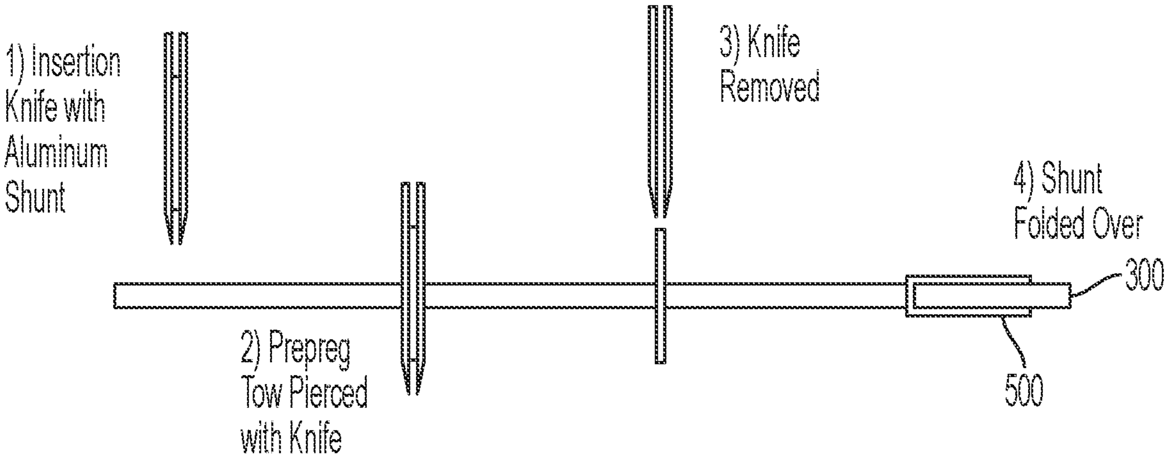

FIG. 5 shows an illustration of one method of insertion of a thermally conductive strip into a composite layer.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

DESCRIPTION

Disclosed are configurations of a composite structure coated with ultra-smooth glass micro sheet for improved smoothness. Such surfaces can be useful as non-stick, hydrophobic and/or ice-phobic surface treatments, special optical coatings and as electro-magnetic functional surfaces. In some embodiments, the composite structure can be used for reflection of infrared or radio frequency radiation. Commercial applications include, but are not limited to, use in microwave dish reflectors and telescope reflectors. The structures enable sufficiently smooth surface for proper application and bonding for subsequent application of thin-film coatings. The manufacturing process ensures proper curing at the glass-carbon interface to ensure no voids. The smoothness is achieved by placing a glass micro sheet on the tool surface in the layup process and co-bonding with the remaining structural features.

The hybrid assembly is co-cured in an autoclave at elevated temperatures between 130 and 350° F. and at an elevated pressure of between 15 and 85 psi while the assembly is held under vacuum pressure. In some instances, the hybrid assembly may be co-cured at reduced pressure in an atmospheric pressure oven while the assembly is held under vacuum pressure. In both cases the hybrid assembly may be co-bonded between glass and composite by making use of the composite resin matrix alone, or with an additional layer of similar neat resin inserted at the glass composite interface. The hybrid assembly is co-cured on smooth tooling with matched thermal expansion properties to those of the hybrid components, such as an alloy of Invar or composite tooling itself. The smooth glass surface may be protected on the tool side surface by use of a thin protective polymer film layer such as an inert fluoropolymer or other suitable non-bonding film. The technique allows for the use of a variety of matrix/bond resin chemistries such as modified epoxy or cyanate ester thermosetting precursors.

Also disclosed is the use of aluminum conductive strips in composite structures to conduct heat away from the composite structure. An exemplary use for such composite structures is in aircraft prepreg structures. The aluminum conductive strips act as a shunt to increase heat transfer perpendicular to the plane of the composite structure. The high emissivity glass micro sheet dissipates the heat away from the composite structure.

Disclosed herein as demonstrated in the Figures, are articles comprising: (a) a glass micro sheet 200 having top and bottom surfaces, wherein the glass micro sheet 200 has a thickness of about 0.001 to about 0.040 inches; and (b) a multi-layered composite film 300 comprising a plurality of composite layers, the multi-layered composite film 300 having top and bottom surfaces, wherein the bottom layer of the glass micro sheet 200 is bonded to the top surface of the multi-layered composite film 300 comprising a plurality of composite layers; and wherein the top surface of the glass micro sheet 200 has a surface roughness less than about 1 μm.

Surface roughness, as recited herein, is measured by a light scattering technique as described in ASTM D523 (2018). The surface roughness is a value less than about 1 μm or about 0.5 nm or less, between about 1 nm and about 1 μm or about 500 nm and about 1 μm or between about 0.5 nm and about 1 μm. In some embodiments, surface roughness (Ra) is in the range of between about 1 μm up to about 25 μm or 1 nm<Ra<1 μm.

Figure 1:
FIG. 1 shows a schematic representation of an exemplary embodiment of assembling and curing a composite structure.

FIG. 1 presents a schematic representation of a process where a micro glass sheet 200 is placed on a tool surface. A skin layer comprising a plurality of composite layers 300 is then placed on top of the glass. A backing material is then placed on the composite layer 300 and the assembly is then cured. The resulting composite article has an ultra-smooth glass surface. The backing material is a release ply material that facilitates removal of the cured composite part from the vacuum bagging and curing tool.

Figure 2:
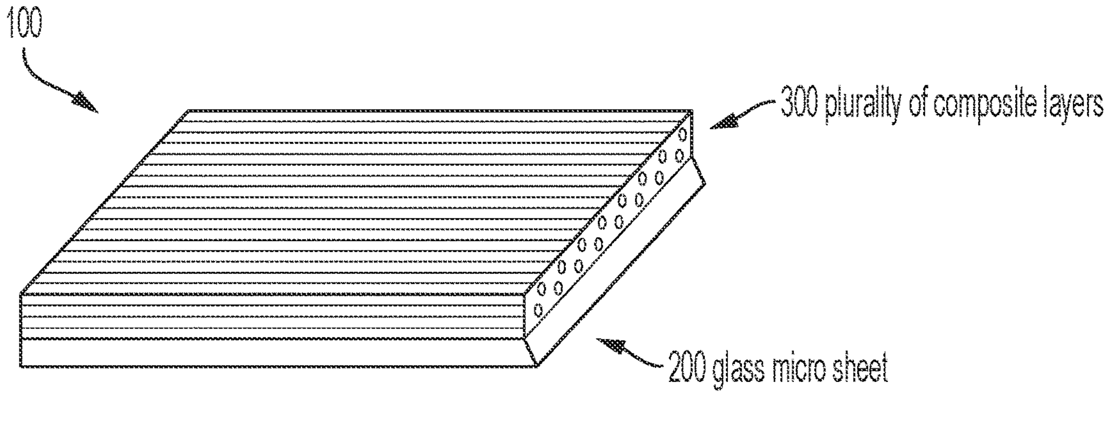
FIG. 2 shows an illustration of a structure having a plurality of composite layers adhered to a glass micro sheet.

FIG. 2 shows an illustration of an article having a glass micro sheet 200 residing on a plurality of composite layers 300.

As used herein, the term "composite material" refers to a material made of two or more constituent materials, such as, for example, reinforcing fibers embedded in a polymer resin matrix. In some embodiments, the composite layers 300 comprise carbon fiber-reinforced composite, fiberglass composite or a combination thereof. Some carbon fiber-reinforced composite layers comprise a high strength fiber with about 150 to 190 g/m$^2$ fiber nominal weight and from about 38 to about 43 Msi modulus suitable for unidirectional tape. In some embodiments, the composite layers 300 are carbon fiber-reinforced composite layers which comprise a resin that comprises a toughened epoxy or cyanate ester thermosetting polymer capable of 350° F. service temperature. Alternative epoxy and cyanate ester resin formulations curing at 250° F. may also be used. The resin content of the composite can be anywhere from about 55% to about 60% resin on a dry fiber basis. Some fiberglass composite layers comprise glass or low dielectric quartz woven fabric reinforced resin. The resin can comprise a toughened epoxy or cyanate ester thermosetting polymer capable of 350° F. service. The resin content can be from about 45% to about 60% of the fabric on a dry fiber basis. Some glass micro sheets 200 have a thickness from about 0.001 to about 0.040 inches or from about 0.002 to about 0.020 inches. In some embodiments, the glass micro sheet 200 is a flexible glass sheet. Some glass materials comprise a borosilicate glass. Suitable flexible glass sheets include, but are not limited to alkaline earth boro-aluminosilicate glass sheets, which can be fusion formed (e.g., Eagle XG™ and Willow Glass™, both manufactured by Corning, Inc.)

In some embodiments, the plurality of composite layers 300 comprises fibers having a uniaxial orientation. In certain composite articles 100, each composite layer comprises a plurality of substantially parallel carbon or graphite fibers wherein at least one of the composite layers 300 is positioned such that fibers within the at least one layer are at an approximately 90 degree angle to fibers in at least one other layer.

Some articles 100 further comprise one or more thermally conductive strips 500 embedded at predetermined positions in each composite layer 300 to conduct heat through the thickness of the plurality of composite layers 300 in the z direction. The "z" direction is the direction that is perpendicular to the plurality of composite layers. In some embodiments, each thermally conductive strip 500 is configured such that two substantially linear portions are connected by an arcuate portion, where the linear portions are substantially parallel to each other and contact the top and bottom surfaces of the composite layer 300. In certain embodiments, the thermally conductive strips 500 in each layer of the plurality of composite layers comprise aluminum, gold or silver. In some embodiments, the thermally conductive strips 500 comprise aluminum.

FIG. 3 shows an illustration of an article 100 having a glass micro sheet 200 placed on a plurality of composite layers 300, the composite layers 300 having a plurality of thermally conductive strips 500.

FIG. 4 shows an illustration of the placement of thermally conductive strips 500, aluminum thermal shunts in this case, into a composite layer 300. In this illustration, the composite layer 300 comprises graphite fiber tow.

If the thermally conductive strips 500 are positioned too far from the closest thermally conductive strip 500, thermal conductivity will suffer. If the thermally conductive strips 500 are positioned too close together, the strength of the article 100 can be negatively impacted. In certain embodiments, each thermally conductive strip 500 covers about 0.010 to about 0.75 inches in its largest dimension on the top and bottom of the composite layer 300 and the center of each thermally conductive strip 500 is positioned about 0.020 to about 3 inches from the center of the thermally conductive strip 500 that is closest to that thermally conductive strip 500. In certain methods, the thermally conductive strips 500 cover about 0.010 to about 0.75 inch or about 0.25 to about 0.75 inch for the largest dimension. In some methods, the center of each conductive strip 500 is positioned about 0.020 to about 3 inches or about 0.5 and about 3 inches or about 0.5 and about 2.5 inches from the center of the thermally conductive strip 500 that is closest to that thermally conductive strip 500.

In certain embodiments, the thermally conductive strips 500 in adjoining layers are vertically aligned to facilitate conducting heat through the thickness of the plurality of composite layers 300 in the z direction.

FIG. 5 shows an illustration of insertion of a thermally conductive strip 500, in this case an aluminum shunt, into a composite layer 300 and folding the shunt over such that the thermally conductive strip 500 is configured such that two substantially linear portions are connected by an arcuate portion, where the linear portions are substantially parallel to each other and contact the top and bottom surfaces of the composite layer 300.

Some articles 100 further comprise a thin film coating applied to the top surface of the glass micro sheet 200. In some embodiments, the thin film coating serves to reflect infrared or radio frequency radiation.

Disclosed herein are methods of making a composite article 100, the method comprising forming an assembly by: (a) placing a glass micro sheet 200 having top and bottom surfaces and a thickness of about 0.001 to about 0.040 inches on a tool surface; the top surface of the glass micro sheet 200 contacting the tool surface; (b) placing a structure comprising a plurality of composite layers 300 on the glass micro sheet 200, the structure having top and bottom surfaces where the top surface of the structure contacts the bottom surface of the glass micro sheet 200; (c) placing a backing material on the structure, the backing material having top and bottom surfaces, such that the backing material contacts the bottom surface of the structure; and (d) curing the assembly to obtain the composite article 100, wherein the top surface of the glass micro sheet 200 of the composite article 100 has a surface roughness of less than about 1 μm.

In some methods, the plurality of composite layers 300 forming the structure comprise carbon fiber-reinforced composite, fiberglass composite or a combination thereof.

In certain methods, each composite layer 300 further comprises one or more thermally conductive strips 500 in each composite layer at predetermined positions to conduct heat through the thickness of the plurality of composite layers 300 in the z direction.

In some methods, each thermally conductive strip 500 is configured such that two substantially linear portions are connected by an arcuate portion, where the linear portions are substantially parallel to each other and contact the top and bottom surfaces of the composite layer 300.

The thermally conductive strips 500 in each layer of the plurality of composite layers 300 comprise aluminum in some methods.

Some thermally conductive strips 500 cover about 0.010 to about 0.75 inches in its largest dimension on the top and bottom of the composite layer 300 and the center of each thermally conductive strip 500 is positioned about 0.020 to about 3 inches from the center of the thermally conductive strip 500 that is closest to that thermally conductive strip 500. In certain methods, the conductive strips 500 cover about 0.010 to about 0.75 inch or about 0.25 to about 0.75 inch for the largest dimension. In some methods, the center of each thermally conductive strip 500 is positioned about 0.020 to about 3 inches or about 0.5 and about 3 inches or about 0.5 and about 2.5 inches from the center of the thermally conductive strip 500 that is closest to that thermally conductive strip 500.

Some composite articles 100 are a panel. Such panels can be utilized in the production of aircraft structures, microwave dish reflectors, telescope reflectors, passive thermal radiators, and other functional purposes while imparting novel decorative appearance.

Some composite articles 100 have the plurality of composite layers 300 comprising fibers having a uniaxial orientation. In certain composite articles 100, each composite layer 300 comprises a plurality of substantially parallel carbon or graphite fibers wherein at least one of the composite layers is positioned such that fibers within the at least one layer are at an approximately 90 degree angle to fibers in at least one other layer.

The top surface of the glass micro sheet 200 in some composite articles 100 are covered with a thin film coating.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

When values are expressed as approximations, by use of the antecedent "about," it will be understood that the particular value forms another embodiment. All ranges are inclusive and combinable.

Further, the disclosure comprises additional notes and examples as detailed below.

Example 1 includes articles comprising:

(a) a glass micro sheet having top and bottom surfaces and a thickness of about 0.001 to about 0.040 inches; and (b) a multi-layered composite film comprising a plurality of composite layers, the multi-layered composite film having top and bottom surfaces, wherein the bottom layer of the glass micro sheet is bonded to the top surface of the multi-layered composite film comprising a plurality of composite layers; and wherein the top surface of the glass micro sheet has a surface roughness (Ra) of the top surface of the glass micro sheet is less than about 1 nm<Ra<1 μm.

Example 2 includes the article of Example 1, wherein the composite layers comprise carbon fiber-reinforced composite, fiberglass composite or a combination thereof.

Example 3 includes the article of Example 1 or Example 2, wherein the composite layers are carbon fiber-reinforced composite layers which comprise carbon fibers having a fiber strength of about 190 $g/m^2$ and a modulus from about 38 to about 43 Msi.

Example 4 includes the article of any one of Examples 1-3, wherein the composite layers are carbon fiber-reinforced composite layers which comprise epoxy or cyanate ester thermosetting polymer.

Example 5 includes the article of any one of Examples 1-3, wherein the composite layers are fiberglass composite layers, which comprise glass or low dielectric quartz woven fabric reinforced resin.

Example 6 includes the article according to any one of Examples 1-5, wherein the glass micro sheet has a thickness of about 0.002 to about 0.020 inches.

Example 7 includes the article according to any one of Examples 1-6, wherein the glass micro sheet comprises borosilicate glass.

Example 8 includes the article according to any one of Examples 1-7, wherein the glass micro sheet comprises alkaline earth boro-aluminosilicate glass, such as Eagle XG™ or Willow™ glass.

Example 9 includes the article of any one of Examples 1-8, wherein the plurality of composite layers comprises fibers having a uniaxial orientation.

Example 10 includes the article of any one of Examples 1-9, wherein the article further comprises one or more thermally conductive strips embedded at predetermined positions in each composite layer to conduct heat through the thickness of the plurality of composite layers in the z direction.

Example 11 includes the article of Example 10, wherein each thermally conductive strip is configured such that two substantially linear portions are connected by an arcuate portion, where the linear portions are substantially parallel to each other and contact the top and bottom surfaces of the composite layer.

Example 12 includes the article of Example 10 or Example 11, wherein the thermally conductive strips in each layer of the plurality of composite layers comprise aluminum, silver or gold.

Example 13 includes the article of Example 10 or Example 11, wherein the thermally conductive strips in each layer of the plurality of composite layers comprise aluminum.

Example 14 includes the article of any one of Examples 9-13, wherein each thermally conductive strip covers about 0.010 to about 0.75 inches in its largest dimension on the top and bottom of the composite layer and the center of each thermally conductive strip is positioned about 0.020 to about 3 inches from the center of the thermally conductive strip that is closest to that thermally conductive strip.

Example 15 includes the article of any one of Examples 9-14, wherein the thermally conductive strips in adjoining layers are vertically aligned to facilitate conducting heat through the thickness of the plurality of composite layers in the z direction.

Example 16 includes the article of any one of Examples 9-15, further comprising a thin film coating applied to the top surface of the glass micro sheet.

Example 17 includes a satellite panel comprising the article of Example 1.

Example 18 includes methods of making a composite article, the method comprising:

forming an assembly by:

placing a glass micro sheet having top and bottom surfaces and a thickness of about 0.001 to about 0.040 inches on a tool surface; the top surface of the glass micro sheet contacting the tool surface;

placing a structure comprising a plurality of composite layers on the glass micro sheet, the structure having top and bottom surfaces where the top surface of the structure contacts the bottom surface of the glass micro sheet;

placing a backing material on the structure, the backing material having top and bottom surfaces, such that the backing material contacts the bottom surface of the structure; and curing the assembly to obtain the composite article, wherein the top surface of the glass micro sheet of the composite article has a surface roughness (Ra) of the top surface of the glass micro sheet is less than about 1 nm<Ra<1 μm.

Example 19 includes the method of Example 18, wherein the assembly is cured using an autoclave.

Example 20 includes the method of Example 18 or Example 19, wherein the top surface of the glass micro sheet of the composite article has a surface roughness between about 1 nm and about 1 μm.

Example 21 includes the method of any one of Examples 18-20, wherein the plurality of composite layers forming the structure comprise carbon fiber-reinforced composite, fiberglass composite or a combination thereof.

Example 22 includes the method of any one of Example 18-21, wherein each composite layer further comprises one or more thermally conductive strips in each composite layer at predetermined positions to conduct heat through the thickness of the plurality of composite layers in the z direction.

Example 23 includes the method of any one of Examples 18-22, wherein each thermally conductive strip is configured such that two substantially linear portions are connected by an arcuate portion, where the linear portions are substantially parallel to each other and contact the top and bottom surfaces of the composite layer.

Example 24 includes the method of any one of Examples 18-23, wherein the thermally conductive strips in each layer of the plurality of composite layers comprise aluminum, silver or gold.

Example 25 includes the method of any one of Examples 18-23, wherein the thermally conductive strips in each layer of the plurality of composite layers comprise aluminum.

Example 26 includes the method of any one of Examples 18-25, wherein each thermally conductive strip covers about 0.010 to about 0.75 inch in its largest dimension on the top and bottom of the composite layer and the center of each thermally conductive strip is positioned about 0.020 to about 3 inches from the center of the thermally conductive strip that is closest to that thermally conductive strip.

Example 27 includes the method of any one of Examples 18-26, wherein the composite article is a panel.

Example 28 includes the method of any one of Examples 18-27, wherein the plurality of composite layers comprises fibers having a uniaxial orientation.

Example 29 includes the method of any one of Examples 18-28, wherein each composite layer comprises a plurality of substantially parallel carbon or graphite fibers wherein at least one of the composite layers is positioned such that fibers within the at least one layer are at an approximately 90 degree angle to fibers in at least one other layer.

Example 30 includes the method of any one of Examples 18-29, further comprising applying a thin film coating to the top surface of the glass micro sheet.

What is claimed:

1. An article comprising:

a pre-formed glass micro sheet having top and bottom surfaces, wherein the glass micro sheet has a thickness of about 0.001 to about 0.040 inches;

a multi-layered composite film comprising a plurality of composite layers, said plurality of composite layers comprising a carbon fiber-reinforced composite, a fiberglass composite, or a combination thereof, the multi-layered composite film having top and bottom surfaces; and a plurality of discrete thermally conductive strips embedded in the multi-layered composite at predetermined positions along each one of the composite layers to conduct heat through the thickness of the plurality of composite layers in a direction perpendicular to the plurality of composite layers, wherein the bottom surface of the glass micro sheet is co-bonded to the top surface of the multi-layered composite film, comprising the plurality of composite layers, during cure of an epoxy or cyanate ester thermoset resin matrix of the multi-layered composite film in an autoclave at a temperature between about 130° F. and 350° F. and at a pressure of between about 15 psi and 85 psi while held under vacuum pressure;

wherein, after cure, a glass-composite interface is void-free;

wherein surface roughness (Ra) of the top surface of the glass micro sheet is 1 nm<Ra<1 μm; and wherein each one of the plurality of composite layers comprises a top surface and a bottom surface; and wherein each of the thermally conductive strips comprises:

a plate-shaped lower linear portion that is substantially parallel to and in contact with the bottom surface of an associated one of the plurality of composite layers;

a plate-shaped upper linear portion that is substantially parallel to and in contact with the top surface of the associated one of the plurality of composite layers; and an arcuate portion that connects the plate-shaped lower linear portion and the plate-shaped upper linear portion.

2. The article according to claim 1, wherein the glass micro sheet has a thickness from about 0.002 to about 0.020 inches.

3. The article of claim 1, wherein:

the plurality of composite layers comprises fibers having a uniaxial orientation; and the article further comprises a layer of neat resin of substantially the same chemistry as the resin matrix situated between the fibers and the glass micro sheet.

4. The article of claim 1, wherein the thermally conductive strips comprise aluminum.

5. The article of claim 1, wherein each thermally conductive strip is from about 0.01 to about 0.75 inches in its largest dimension.

6. The article of claim 1, wherein the thermally conductive strips in adjoining ones of the composite layers are vertically aligned to facilitate conducting heat through the thickness of the plurality of composite layers in a direction that is perpendicular to the plurality of composite layers.

7. The article of claim 1, further comprising a film coating applied to the top surface of the glass micro sheet.

8. A satellite panel comprising the article of claim 1.

9. The article according to claim 1, wherein:

the plate-shaped lower linear portion of at least one of the thermally conductive strips is also substantially parallel to and in contact with the top surface of an adjoining lower one of the plurality of composite layers; and the plate-shaped upper linear portion of at least one of the thermally conductive strips is substantially parallel to and in contact with the bottom surface of an adjoining upper one of the plurality of composite layers.

10. The article of claim 1, wherein the thermally conductive strips comprise gold.

11. The article of claim 1, wherein the thermally conductive strips comprise silver.

12. The article of claim 1, wherein a center of each thermally conductive strip is positioned from about 0.02 to about 3 inches from the center of the thermally conductive strip that is closest to that thermally conductive strip.

13. A method of making a composite article, the method comprising:

forming an assembly by:

placing a pre-formed glass micro sheet a tool surface, the glass micro-sheet having a top surface and a bottom surface and a thickness of about 0.001 to about 0.040 inches on a tool surface, such that the top surface of the glass micro sheet contacts the tool surface;

placing a multi-layered composite film on the glass micro sheet, the multi-layered composite film having a top surface and a bottom surface, such that the top surface of the multi-layered composite contacts the bottom surface of the glass micro sheet, wherein:

the multi-layered composite film comprises a plurality of composite layers and a plurality of thermally conductive strips embedded at predetermined positions along each one of the composite layers;

each one of the plurality of composite layers has a top surface and a bottom surface and comprises a carbon fiber-reinforced composite, a fiberglass composite, or a combination thereof; and each of the thermally conductive strips comprises a plate-shaped lower linear portion that is substantially parallel to and in contact with the bottom surface of an associated one of the plurality of composite layers, a plate-shaped upper linear portion that is substantially parallel to and in contact with the top surface of the associated one of the plurality of composite layers, and an arcuate portion that connects the plate-shaped lower linear portion and the plate-shaped upper linear portion;

placing a backing material on the multi-layered composite, the backing material having a top surface and a bottom surface, such that the top surface of the backing material contacts the bottom surface of the multi-layered composite film;

curing the assembly in an autoclave at a temperature between about 130° F. and 350° F. and at a pressure of between about 15 psi and 85 psi while held under vacuum pressure to obtain the composite article; and co-bonding the glass micro sheet to the multi-layered composite film during curing, wherein surface roughness (Ra) of the top surface of the glass micro sheet is 1 nm<Ra<1 μm; and wherein, after cure, a glass-composite interface is void-free.

14. The method of claim 13, wherein the thermally conductive strips comprise aluminum, silver, or gold.

15. The method of claim 13, wherein each thermally conductive strip is from about 0.01 to about 0.75 inch in its largest dimension and the center of each thermally conductive strip is positioned from about 0.02 to about 3 inches from the center of the thermally conductive strip that is closest to that thermally conductive strip.

16. The method of claim 13, wherein the plurality of composite layers comprises fibers having a uniaxial orientation.

17. The method of claim 13, wherein each composite layer comprises a plurality of substantially parallel carbon or graphite fibers wherein at least one of the composite layers is positioned such that fibers within the at least one composite layer are at an approximately 90 degree angle to fibers in at least one other composite layer.

18. The method of claim 13, further comprising applying a thin film coating to the top surface of the glass micro sheet.

19. The article of claim 1, wherein the composite layers are carbon fiber-reinforced composite layers which comprise epoxy or cyanate ester thermosetting polymer.

20. The method of claim 13, wherein the composite layers are carbon fiber-reinforced composite layers which comprise epoxy or cyanate ester thermosetting polymer.

* * * * *